(12) United States Patent
Kim

(10) Patent No.: US 8,223,153 B2
(45) Date of Patent: Jul. 17, 2012

(54) APPARATUS AND METHOD OF AUTHORING ANIMATION THROUGH STORYBOARD

(75) Inventor: Jin-young Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 12/612,709

(22) Filed: Nov. 5, 2009

(65) Prior Publication Data

US 2010/0118036 A1      May 13, 2010

Related U.S. Application Data

(63) Continuation-in-part of application No. 12/425,418, filed on Apr. 17, 2009.

(30) Foreign Application Priority Data

Nov. 13, 2008   (KR) .................. 10-2008-0112732
Jun. 17, 2009   (KR) .................. 10-2009-0054072

(51) Int. Cl.
  *G06T 13/00*  (2006.01)
  *G09G 5/00*  (2006.01)

(52) U.S. Cl. ........................................ 345/473; 345/619

(58) Field of Classification Search ............. 345/473, 345/619
See application file for complete search history.

(56) References Cited

U.S. PATENT DOCUMENTS

| | | |
|---|---|---|
| 2005/0050156 A1 | 3/2005 | Suzuki et al. |
| 2008/0092054 A1* | 4/2008 | Bhumkar et al. ............ 715/739 |
| 2009/0024963 A1* | 1/2009 | Lindley et al. ............... 715/839 |

FOREIGN PATENT DOCUMENTS

| | | |
|---|---|---|
| JP | 2003-271983 | 9/2003 |
| KR | 10-2005-0030619 | 3/2005 |
| KR | 1020080069016 | 7/2008 |

* cited by examiner

*Primary Examiner* — Said Broome
*Assistant Examiner* — Wynton S Jones
(74) *Attorney, Agent, or Firm* — NSIP Law

(57) ABSTRACT

Described herein is an animation authoring apparatus and method thereof for authoring an animation. The apparatus includes a storyboard editor that provides a storyboard editing display that a user may interact with to edit a storyboard, and to store the edited storyboard. The apparatus further includes a parser to parse syntax of the edited storyboard, and a rendering engine to convert the edited storyboard into a graphic animation based on the parsed syntax of the edited storyboard.

19 Claims, 6 Drawing Sheets

FIG.6

610
- Scene Number: 34
- Scene Description: Minor Collision with Taxi
- Place: Load
- Time: Afternoon
- Characters: Hanna, Taxi driver, Woman
- Primary Props: Hanna's Car, Taxi

620

Cut 1

Cut 2

Cut 3

Cut 4

630

Cut 1
[Camera 3] Bust Shot, Over The Shoulder: Over Shoulder of Hanna and in Front of Taxi Driver
Taxi Driver: (Waving Finger Back and Forth) (Angrily) I Don't Understand.
How Did You Clip My Car on Such A Wide Road?

Cut 2
[Camera 1] Waist Shot: Taxi Driver (80 Degrees on Left) Woman Exits Taxi
Woman Exits Taxi
Woman Walks Toward Hanna
Tax Driver: (Angry at Hanna) I Earn Enough Each Day to Last Me Until The Next...
Taxi Driver Stops Speaking in Surprise.

Cut 3
[Camera 2] Close Up: Hanna (Three Seconds)
[Background music] Beautiful-Girl.mp3 (Slowly)
[Sound effect] Glockenspiel Glissando (Five Seconds, Volume: Normal)
[Illumination] Spotlight on Hanna
Hanna Sweeps Hair up Apologetically

Cut 4
[Camera 3] Shoulder Shot. Over The Shoulder: Over Shoulder of Hanna and in Front of Taxi Driver
Taxi Driver: (In Love at First Sight) Are you OK?

640

| | |
|---|---|
| Shot Room | |
| Left | 0 |
| Right | 0 |
| Top | 0 |
| Bottom | 0 |
| Shot Angle | |
| Vertical Angle | 0 |
| Horizontal Angle | 0 |
| Oblique Angle | 0 |
| Adjust Direction | |
| Pan | 0.0 |
| Tilt | 0.0 |
| Tant | 0.0 |
| View Angle | 0.0 |
| Positon the Camera | |
| Width | 0.0 |
| Height | 0.0 |
| Back/Forward | 0.0 |
| ... | |

APPARATUS AND METHOD OF AUTHORING ANIMATION THROUGH STORYBOARD

CROSS REFERENCE TO RELATED APPLICATION(S)

This application claims the benefit under 35 U.S.C. §119(a) of a Korean Patent Application No. 10-2008-112732, filed Nov. 13, 2008, and a Korean Patent Application No. 10-2009-54072, filed Jun. 17, 2009, the entire disclosures of which are incorporated herein by reference for all purposes. This application is a continuation-in-part application of and claims the benefit of a U.S. patent application Ser. No. 12/425,418, filed Apr. 17, 2009, the entire disclosure of which is incorporated herein by reference for all purposes.

BACKGROUND

1. Field

The following description relates to animation authoring. More particularly, this description relates to authoring an animation movie through editing of a storyboard or a rendered graphic animation.

2. Description of the Related Art

Animation authoring tool software has been developed for use on computers. Animation authoring tool software may be used to create a desired animation graphic by a user interacting with a graphic user interface.

Professional knowledge about story animation directing and camerawork is needed to use such professional authoring tools, making it difficult for ordinary users to use these tools.

Tools exist for authoring animation without a graphic interface through the use of a programmable language script. However, because these graphic animations are created by programmers using a script language, it is difficult for ordinary users to understand and use the tools. Furthermore, the amount of time needed to learn the script language can take a great deal of time.

SUMMARY

In one general aspect, an animation authoring apparatus includes a storyboard editor that comprises a storyboard editing display to interact with a user, to edit a storyboard, and to store the edited storyboard, a parser to parse syntax of the edited storyboard, and a rendering engine to convert the edited storyboard into a graphic animation based on the parsed syntax of the edited storyboard.

The apparatus may further include a file generator to store the graphic animation as a file.

The storyboard editor may include an interface to edit the storyboard according to at least one of a text input and a graphic input from the user.

The apparatus may further include an image output unit to display the graphic animation, the image output unit including an interface to edit the graphic animation through interaction with the user.

The apparatus may further include a graphic animation event processor to extract content of the storyboard from the edited graphic animation and to modify the content of the storyboard.

The parser may parse the syntax of the edited storyboard and create a screen shot image that is representative of a corresponding cut of a scene.

The storyboard editor may further include a directing adjustment window to provide a user interface for enabling the user to adjust a directing value for a line or edited object of the storyboard editing display.

The rendering engine may convert the edited storyboard into a graphic animation by reflecting the directing value set by the user.

The directing adjustment window may provide a user interface for enabling the user to edit directing-related settings including motion, lay-out and audio settings for the graphic animation, and camera-related settings.

In another general aspect, an animation authoring method for use with an animation authoring apparatus, includes displaying a storyboard editing display, converting a storyboard edited by a user using the storyboard editing display into a graphic animation in real time, outputting the graphic animation, and storing a storyboard corresponding to the graphic animation.

The method may further include storing, by a file generator, the graphic animation as a file.

The storyboard editing display may include an interface to receive at least one of a text input and a graphic input from the user and to edit the storyboard according to the at least one of the text input and the graphic input.

The method may further include parsing syntax of the edited storyboard, converting the edited storyboard into the graphic animation in real time according to the result of the parsing, and outputting through an animation playing display the graphic animation.

The converting the edited storyboard into graphic animation may include creating by a parser a screen shot image configured to be representative of a corresponding cut of a scene by parsing syntax of the edited storyboard and reflecting the screen shot image to the storyboard.

The storyboard editing display may include a directing adjustment window to provide a user interface for enabling the user to adjust a directing value for a line or edited object of the storyboard editing display.

The directing adjustment window may provide a user interface for enabling the user to edit directing-related settings including motion, lay-out and audio settings for the graphic animation, and camera-related settings.

The converting the edited storyboard may include converting the edited storyboard into a graphic animation by reflecting the directing value set by the user.

In still another general aspect, an animation authoring method for use with an animation authoring apparatus, includes displaying a graphic animation created according to a previously provided storyboard, the graphic animation including an interface to edit the displayed graphic animation through interaction with a user, extracting content of the storyboard from the edited graphic animation, and editing the content of the storyboard.

The method may further include storing, by a storyboard editor, the edited storyboard.

The method may further include storing, by a file generator, the graphic animation as a file.

The extracting the content of the storyboard and editing the content may include creating by a parser a screen shot image that is configured to be representative of a corresponding cut of a scene by parsing syntax of the storyboard.

Other features and aspects will be apparent from the following description, drawings, and claims.

BRIEF DESCRIPTION OF THE DRAWINGS

FIG. 6 is a diagram illustrating an exemplary storyboard including a screenplay.

Figure 1:
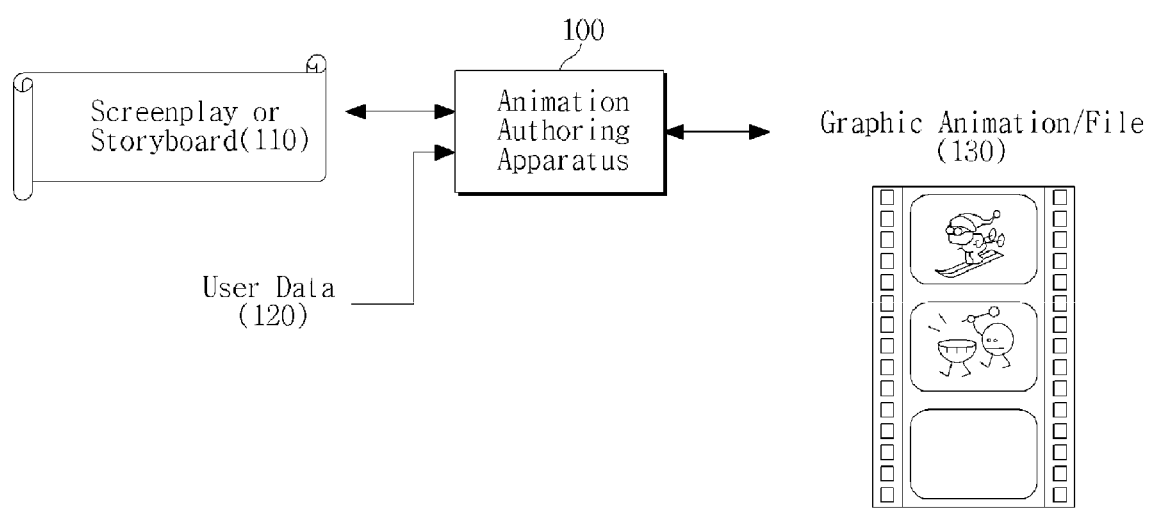
FIG. 1 is a diagram illustrating an exemplary animation authoring apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and structures may be omitted for increased clarity and conciseness.

FIG. 1 illustrates an exemplary animation authoring apparatus 100. The animation authoring apparatus 100 receives a screenplay or storyboard 110 (hereinafter "storyboard") and creates a graphic animation or a file 130 (hereinafter "graphic animation"). The animation authoring apparatus 100 may receive user data 120.

The storyboard 110 is commonly used in videos or movies and may be input to the animation authoring apparatus 100, for example, in a text format. In this example, persons and objects appearing in the video may be set by a graphic user interface (GUI) through a graphic icon or in a text format. Directing operation of camerawork, illumination, and the like may be included. An animation, such as motion and expression of the characters may be generated based on a list of commands. New commands may be added, for example, by combining the already existing commands, or by adding new commands to the list of commands.

The graphic animation authoring may be performed using sounds, for example, a natural language, and thus, the animated motions or expressions may be expressed based on the natural language. In addition, a sound effect, a visual effect, and/or a computer graphic effect may be based on the list of commands.

The storyboard 110 may be stored as, for example, a text, a script language, a binary file, and the like.

The user data 120 may be multimedia data added by the user, for example, audio data, video data, and/or image data. The user data 120 may be multimedia data added by the user's selection.

The animation authoring apparatus 100 receives the storyboard 110 or the user data 120, generates a three-dimensional animation real-time rendering, and produces the graphic animation 130. For example, the animation authoring apparatus 100 may interpret the storyboard 110 in real time and perform graphic data processing including characters and/or objects in animated motion. The animation authoring apparatus may perform camerawork and/or process sound or narration using a text to speech (TTS) engine.

For example, the created graphic animation may be created and stored in any desired moving-image format, for example, an MPEG-4 Part 14 ("mp4") format, developed by the International Organization for Standardization (ISO), a Windows Media® Video ("wmv") format, or an Audio Video Interleave ("avi") format, both of which were developed by the Microsoft Corporation, Redmond, Wash. The moving-image formats listed above are merely examples, and are not meant to limit the types of moving-image formats that can be used with the apparatus. The graphic animation may be created in any moving-image format that is desired.

Figure 2:
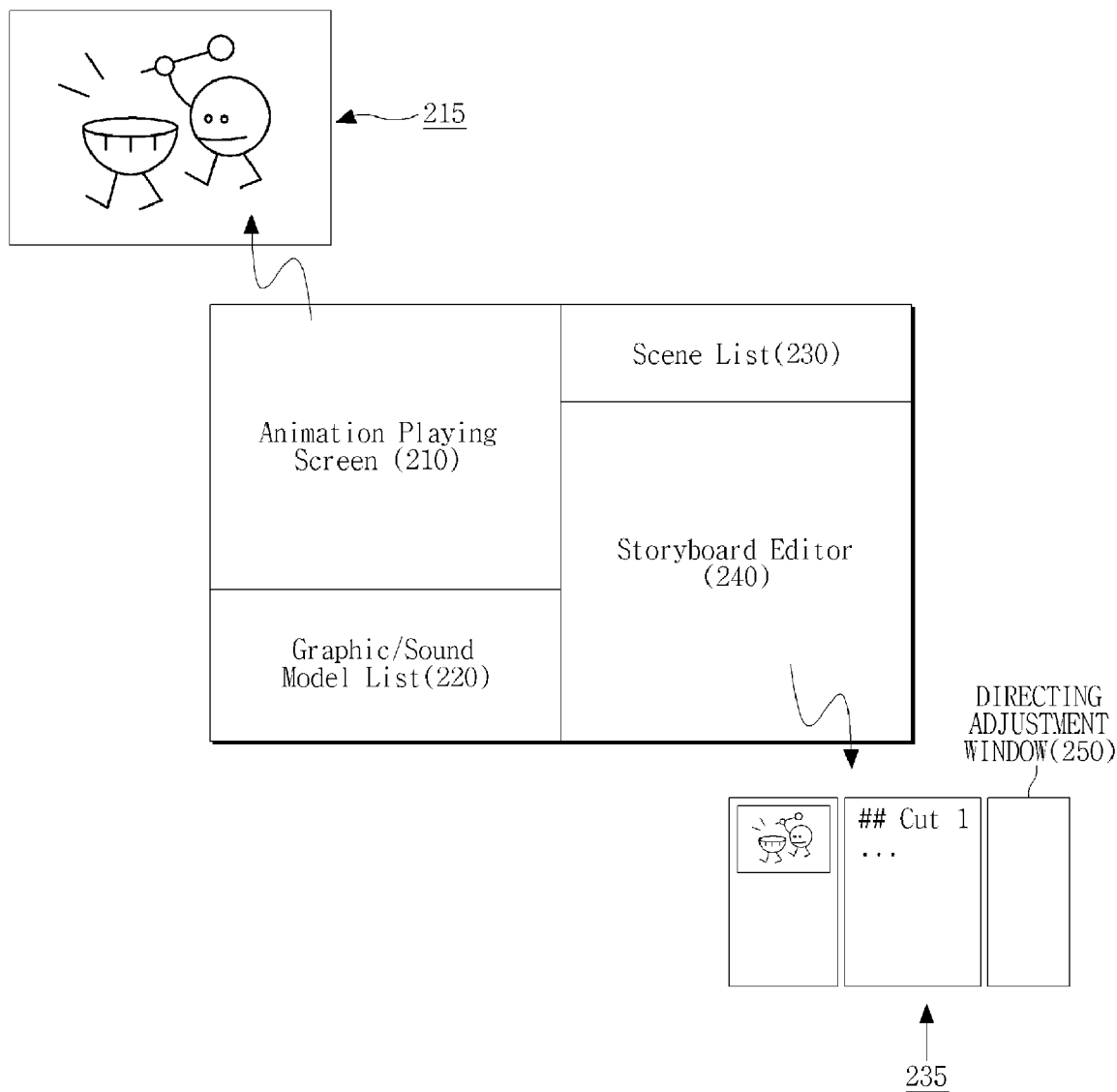
FIG. 2 is a diagram illustrating an exemplary user interface of an animation authoring apparatus including a storyboard editor.

FIG. 2 illustrates an exemplary user interface of an animation authoring apparatus. In this example, the display of the animation authoring apparatus includes an animation playing display 210, a graphic/sound model list 220, a scene list 230, and a storyboard editor 240.

The animation playing display 210 displays a graphic animation 215 that is created by rendering a content of the storyboard 110. The animation playing display 210 may provide a tool and/or parameters for directly editing or modifying the presented graphic animation. When the graphic animation is modified or edited by the user through the animation playing display 210, a content of the storyboard 110 of the modified/edited graphic animation may be confirmed using the storyboard editor 240.

When the storyboard 110 is stored in either a script or a binary format, the edited content in the graphic animation may be stored in a file of the script or the binary format.

The graphic/sound model list 220 provides a list of selectable models of, for example, characters, props, backgrounds, and the like, appearing in the storyboard 110. The graphic/sound model list 220 may provide a list of models of effects, for example, sound effects, visual effects, computer graphic effects, and the like.

The scene list 230 is a display to show a list of scenes of the graphic animation. One or more scenes may be included in a story animation, and the scene list 230 may show a list of scene numbers, screen shot images, and titles. In this example, the screen shot refers to an image that is capable of representing several cuts of the scene. When one scene is selected from the scene list 230, a storyboard 110 of the selected scene 235 may be identified and edited on the storyboard editor 240.

The storyboard editor 240 enables the user to modify or edit the storyboard 110 of the scenes through text input. The content edited through the storyboard editor 240 may be played and confirmed on the animation playing display 210.

Meanwhile, the storyboard editor 240 may further include a directing adjustment window 250. The directing adjustment window 250 provides an interface for enabling the user to adjust settings, for example, motions of characters, camerawork, background music, an illumination, multimedia effects, directing effects in the edited screenplay, and the like. A display on which directing values are adjusted through the directing adjustment window 250 will be described below with reference to FIG. 6.

Figure 3:
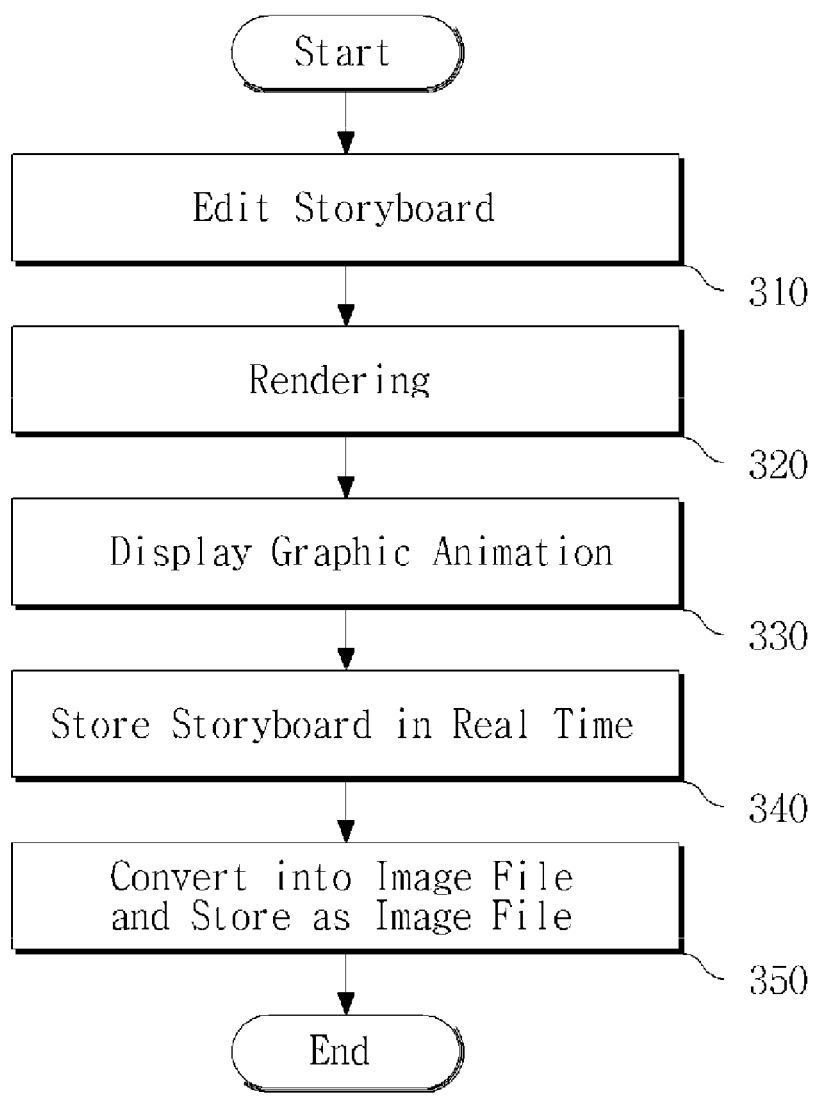
FIG. 3 is a flowchart illustrating an exemplary animation authoring method.

FIG. 3 illustrates an exemplary animation authoring method. When a storyboard editing display is provided, a user edits a storyboard, for example, through the storyboard editing display, in 310. The storyboard editing display may provide an interface to receive text or graphic input from the user to edit the storyboard 110 according to the input. In other words, backgrounds, characters, props, and the like, may be added and edited using the graphic/sound model list 220. The storyboard 110 may be edited in a text format through the storyboard editor 240. Editing the storyboard 110 may include directing indications of a camera, an illumination, effects, the lines of a character, and the like. For example, the user may adjust settings of camerawork, motions of characters, illumination, background music, and other effects through the directing adjustment window 250.

The result of editing the storyboard through interaction with the user is subjected to rendering in 320 and converted into a graphic animation in real time and output in 330. For example, syntax of the storyboard edited through the interaction with the user may be parsed, real-time conversion into the graphic animation may be performed according to the parsing result, and the graphic animation may be output. When the settings of the directing indications have been adjusted through the directing adjustment window 250, the resultant adjusted settings are reflected upon the graphic animation. In this process, a screen shot image that is capable of representing a corresponding cut of a scene may be created by parsing the syntax of the storyboard and reflected to the storyboard.

The storyboard corresponding to the output graphic animation is then stored in 340. The graphic animation may be stored as a file according to a user's selection in 350. The file may be any desired moving-image formats, for example, .avi, .wmv, .mp4, and the like.

An example of parsing the syntax of the storyboard is described below.

A user-produced storyboard 110 may be parsed in real time. For example, the storyboard 110 may be parsed in one or more units, such as a line or a sentence. In this example, there is one unit per subject, for example, a directing element of an animation within the parsed unit. However, it will be appreciated that more than one unit may be used for a subject. The syntax may be parsed and natural language processing may be performed to extract the subject. The extracted subject matter may be any of a character, an accessory, a camerawork, an illumination, an image object, a video object, a text object, a sound effect, a visual effect, a combination thereof, and the like.

When the subject is a character, including the character's lines in the storyboard 110, an animation script corresponding to the character's lines may be produced. When the character includes a motion, a determination may be made as to whether there is a direction or object of the motion, and an animation script including the same may be produced. The direction or object of the motion may include, for example, props, other characters, coordinates, a combination thereof, and the like. When the character includes an expression, content for the character's expression may be parsed.

When the subject is an accessory expressed by a location in the screenplay, content for a location setting of the accessory may be parsed. When the accessory includes a motion, the accessory's motion may be parsed. When there is an object or direction of the motion, the object or direction of the motion may be parsed.

When the subject is a camerawork, a keyword may be parsed. The keyword may correspond to a type of the camerawork. The camerawork may include a close-up, a shoulder shot, and the like. In some embodiments, a subject and a direction of the camerawork may be parsed.

When the subject is an illumination, a keyword may be parsed. The keyword may correspond to a type of the illumination. For example, the illumination may include natural light, such as afternoon sunlight, dawn light, night light, artificial light, such as a fluorescent lamp and an incandescent lamp, partial illumination, such as a spotlight, a combination thereof, and/or other types of light. When there is a partially illuminated object, the object may be parsed.

When the subject is an image object, a play command, such as "show" or "hide" may be parsed. Also, an image file path may be confirmed.

When the subject is a video/sound object, a play command, for example, play, stop, pause, repeat, and the like, may be parsed. Also, a path of a video/sound file may be confirmed.

When the subject is a text object, a determination may be made as to whether there is a play command, for example, text animation, and the text object may be confirmed.

When the subject is a sound, a keyword may be parsed to determine whether the sound is on the list.

When the subject is a visual effect, a keyword may be parsed to determine whether the visual effect is on the list.

Figure 4:
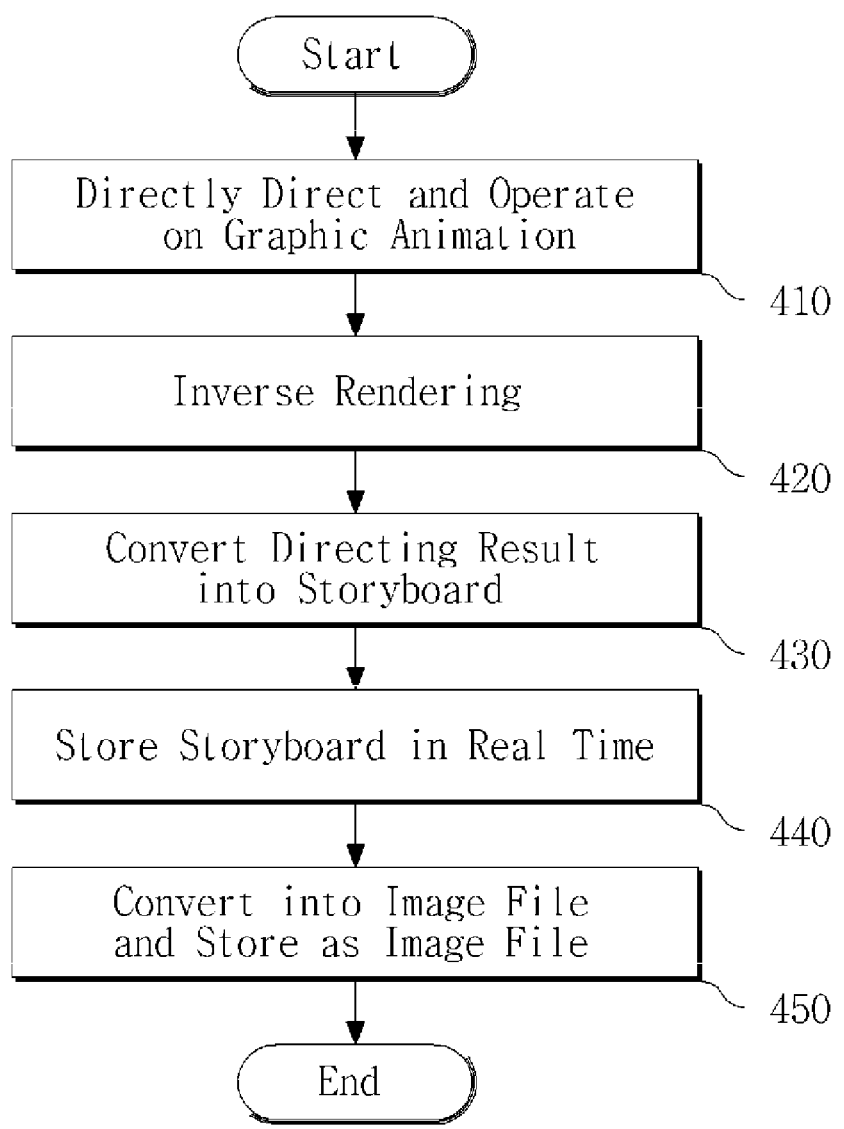
FIG. 4 is a flowchart illustrating another exemplary animation authoring method.

FIG. 4 illustrates another exemplary animation authoring method.

When a graphic animation created according to a previously provided storyboard is displayed on the animation playing display 210, the animation may be edited through interaction with a user to perform a directing operation in 410. The animation playing display 210 provides an interface for receiving a text input or a graphic input from the user, as described above with respect to FIG. 3. For example, backgrounds, characters, props, and the like, of the display, may be added and edited using the graphic/sound model list 220.

The content of the storyboard is then extracted in 420 from the edited and directed graphic animation, and the storyboard is generated in 430. Inverse rendering may be performed on the graphic animation to convert the user-operated content into a storyboard format in 420. For example, syntax of the storyboard may be parsed to create a screen shot image that is capable of being representative of a corresponding cut.

The converted storyboard is stored in real time in 440 and may be converted/stored as an image file according to the user's selection in 450.

Figure 5:
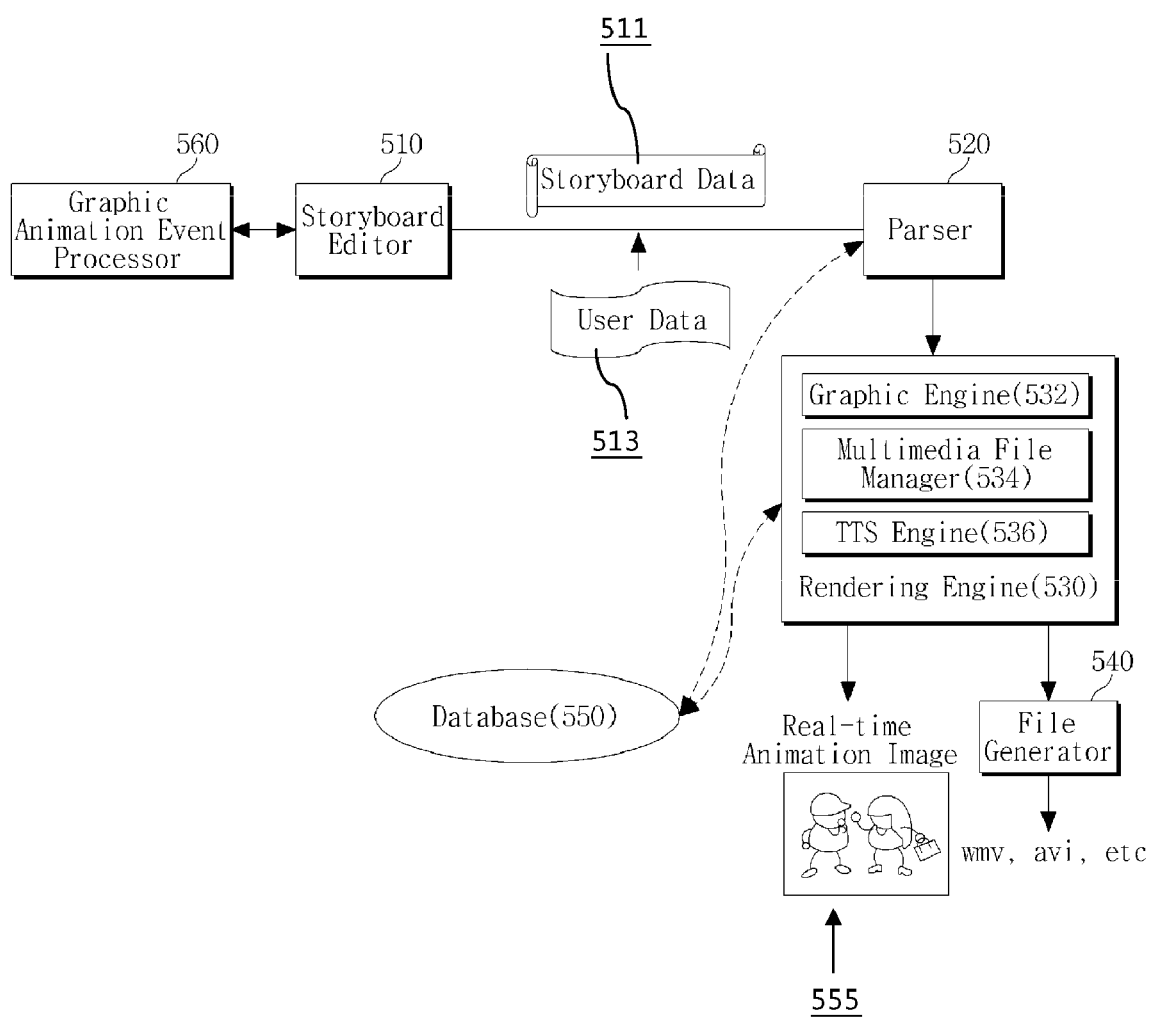
FIG. 5 is a diagram illustrating another exemplary animation authoring apparatus.

FIG. 5 illustrates another exemplary animation authoring apparatus.

Referring to FIG. 5, an exemplary animation authoring apparatus may include a storyboard editor 510, a parser 520, and a rendering engine 530. The storyboard editor 510 provides a storyboard editing display and stores a result of editing a storyboard through interaction with a user. The storyboard editor 510 may provide an interface for editing the storyboard according to text input or graphic input from the user. For example, the storyboard editor 510 may deliver storyboard data 511 edited by the user to the parser 520. User data 513 may be added. As described above, the storyboard editor 510 may include a directing adjustment window 250 to enable the user to adjust settings for motions of characters, camerawork, and other directing effects in the edited storyboard. In this example, the adjusted directing values set through the directing adjustment window 250 are added to the storyboard edited by the user.

The parser 520 parses syntax of the edited storyboard. An example of parsing the syntax has been described above. The parser 520 may parse the syntax of the storyboard 110 and may create a screen shot image that is representative of a corresponding cut of a scene.

The rendering engine 530 converts the edited storyboard into a graphic animation based on the parsing result from the parser 520. The rendering engine 530 may include a graphic engine 532 to create a three-dimensional graphic image. The rendering engine 530 may include a multimedia file manager 534 to manage audio/video/image data and to combine the data with the graphic image created by the graphic engine 532. The rendering engine 530 may include a TTS engine 536 to convert text data into speech data. The rendering engine 530 may refer to data of characters, props, and the like, stored in a database 550.

The rendering engine 530 creates a real-time graphic animation 555. Meanwhile, a file generator 540 stores the converted graphic animation as a file. The file may have any of a variety of widely used formats, for example, .avi format, .wmv format, .mp4 format, and the like.

The converted graphic animation from the rendering engine 530 may be displayed through an image output unit (not shown). For example, the graphic animation may be output through the animation playing display 210 of FIG. 2. The image output unit provides an interface to edit the output graphic animation through interaction with the user. A graphic animation event processor 560 may extract the content of the storyboard from the edited graphic animation and may modify the content of the storyboard.

FIG. 6 illustrates an example of a storyboard including a screenplay.

In this example, the storyboard includes scene information 610, a screen shot 620 for each cut of a scene, and a screenplay 630. The storyboard may further include a directing adjustment window 640. The scene information 610 may include information constituting a scene, such as a scene number, content, places, time, characters, props, and the like. The screen shot 620 may show a screen shot selected by a user at a desired point in time through image preview. Screen shots may be stored for each automatically determined time, and a screen shot that is suitable by policy may be selected from the stored screen shots in consideration of a total play time of a corresponding cut of a scene. The screenplay 630 may show a character's lines, as well as indications of motions of the characters, camerawork, illumination, and other directing effects.

The directing adjustment window 640 provides a window for enabling the user to adjust the directing values for one or more lines and/or objects of the screenplay 630.

For example, when a line of "[Camera 1] Waist Shot: Tax driver (80 degrees on Left)" in Cut 2 is mouse-clicked, the directing value corresponding to the line is displayed on the directing adjustment window 640. Referring to FIG. 6, the directing adjustment window 640 displays several settings such as a shot room indicating a direction in which a shot is to be performed, a shot angle indicating an angle of the shot, motion and location of the camera, and the like, which may be set by the user.

Although the adjustment is performed in terms of a line, a plurality of objects in one line may be adjusted in other exemplary embodiments. For example, a setting for each object may be displayed on the directing adjustment window 640 and may be adjusted by the user.

Users can author graphic animations without the need for detailed knowledge about graphic animation authoring and the animation authoring apparatus. The user can edit the storyboard based on a natural language, and may produce or modify the content while simultaneously confirming graphic animations and story progressing.

Furthermore, the user can confirm a rough image and story through the graphic animation using a scenario prior to actual photographing, to predict the photographing result.

The above-described apparatuses and methods may be recorded, stored, or fixed in one or more computer-readable storage media that includes program instructions to be implemented by a computer to cause a processor to execute or perform the program instructions. The media may also include, alone or in combination with the program, instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above, or vice versa. In addition, a computer-readable storage medium may be distributed among computer systems connected through a network and computer-readable codes or program instructions may be stored and executed in a decentralized manner.

As a non-limiting illustration, "animation" or "graphic animation" used herein may also be referred to as, for example, computer graphics, simulations, moving pictures, cartoons, animatronics, and the like.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An animation authoring apparatus comprising:
a storyboard editor that comprises a storyboard editing display to interact with a user, to edit a storyboard, and to store the edited storyboard, wherein the storyboard comprises scene information, a screen shot for each cut, a screenplay, and a directing adjustment window to enable a user to adjust a directing value for a line or edited object of the storyboard editing display, all being displayed on the storyboard at the same time;
a parser to parse syntax of the edited storyboard; and
a rendering engine to convert the edited storyboard into a graphic animation based on the parsed syntax of the edited storyboard.

2. The apparatus of claim 1, further comprising a file generator to store the graphic animation as a file.

3. The apparatus of claim 1, wherein the storyboard editor comprises an interface to edit the storyboard according to at least one of a text input and a graphic input from the user.

4. The apparatus of claim 1, further comprising an image output unit to display the graphic animation, the image output unit including an interface to edit the graphic animation through interaction with the user.

5. The apparatus of claim 4, further comprising a graphic animation event processor to extract content of the storyboard from the edited graphic animation and to modify the content of the storyboard.

6. The apparatus of claim 1, wherein the parser parses the syntax of the edited storyboard and creates a screen shot image that is representative of a corresponding cut of a scene.

7. The apparatus of claim 1, wherein the rendering engine converts the edited storyboard into a graphic animation by reflecting the directing value set by the user.

8. The apparatus of claim 1, wherein the directing adjustment window provides a user interface for enabling the user to edit directing-related settings including motion, lay-out and audio settings for the graphic animation, and camera-related settings.

9. An animation authoring method for use with an animation authoring apparatus, the method comprising:
displaying a storyboard editing display to edit a storyboard, wherein the storyboard comprises scene information, a screen shot for each cut, a screenplay, and a directing adjustment window to enable a user to adjust a directing value for a line or edited object of the storyboard editing display, all being displayed on the storyboard at the same time;
converting parsed syntax of a storyboard edited by a user using the storyboard editing display, into a graphic animation in real time;
outputting the graphic animation; and
storing a storyboard corresponding to the graphic animation.

10. The method of claim 9, further comprising:
storing, by a file generator, the graphic animation as a file.

11. The method of claim 9, wherein the storyboard editing display comprises an interface to receive at least one of a text input and a graphic input from the user and to edit the storyboard according to the at least one of the text input and the graphic input.

12. The method of claim 9, further comprising:
parsing syntax of the edited storyboard;
converting the edited storyboard into the graphic animation in real time according to the result of the parsing; and
outputting the graphic animation through an animation playing display.

13. The method of claim 9, wherein the converting the edited storyboard into graphic animation comprises creating by a parser a screen shot image configured to be representative of a corresponding cut of a scene by parsing syntax of the edited storyboard and reflecting the screen shot image to the storyboard.

14. The method of claim 9, wherein the directing adjustment window provides a user interface for enabling the user to edit directing-related settings including motion, lay-out and audio settings for the graphic animation, and camera-related settings.

15. The method of claim 9, wherein the converting the edited storyboard comprises converting the edited storyboard into a graphic animation by reflecting the directing value set by the user.

16. An animation authoring method for use with an animation authoring apparatus, the method comprising:
converting parsed syntax of a storyboard edited by a user using a storyboard editing display, into a graphic animation;
displaying the graphic animation created according to the storyboard, the graphic animation including an interface to edit the displayed graphic animation through interaction with a user;
extracting content of the storyboard from the edited graphic animation; and
editing the content of the storyboard,
wherein the storyboard comprises scene information, a screen shot for each cut, a screenplay, and a directing adjustment window to enable a user to adjust a directing value for a line or edited object of the storyboard editing display, all being displayed on the storyboard at the same time.

17. The method of claim 16, further comprising:
storing, by a storyboard editor, the edited storyboard.

18. The method of claim 16, further comprising:
storing, by a file generator, the graphic animation as a file.

19. The method of claim 16, wherein the extracting the content of the storyboard and editing the content comprises creating by a parser a screen shot image that is configured to be representative of a corresponding cut of a scene by parsing syntax of the storyboard.

* * * * *